United States Patent
Namou et al.

(10) Patent No.: US 10,457,158 B2
(45) Date of Patent: Oct. 29, 2019

(54) VEHICLE ARCHITECTURES, ELECTRICAL SYSTEMS, AND CONTROL ALGORITHMS FOR ARBITRATING VEHICLE CHARGING

(71) Applicant: GM GLOBAL TECHNOLOGY OPERATIONS LLC, Detroit, MI (US)

(72) Inventors: Andrew J. Namou, West Bloomfield, MI (US); Brandon R. Jones, White Lake, MI (US); Douglas S. Cesiel, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 277 days.

(21) Appl. No.: 15/619,749

(22) Filed: Jun. 12, 2017

(65) Prior Publication Data

US 2018/0354383 A1 Dec. 13, 2018

(51) Int. Cl.
| | |
|---|---|
| *B60L 53/12* | (2019.01) |
| *B60L 53/14* | (2019.01) |
| *B60L 53/66* | (2019.01) |
| *B60L 53/00* | (2019.01) |

(52) U.S. Cl.
CPC ............... *B60L 53/14* (2019.02); *B60L 53/00* (2019.02); *B60L 53/12* (2019.02); *B60L 53/66* (2019.02); *B60L 2240/80* (2013.01); *B60L 2250/10* (2013.01)

(58) Field of Classification Search
CPC combination set(s) only.
See application file for complete search history.

(56) References Cited

U.S. PATENT DOCUMENTS

| | | |
|---|---|---|
| 2008/0265835 A1 | 10/2008 | Reed et al. |
| 2010/0198754 A1 | 8/2010 | Jones et al. |
| 2012/0091959 A1* | 4/2012 | Martin ............... B60L 11/1833 320/109 |
| 2012/0153717 A1* | 6/2012 | Obayashi ........... B60L 11/1816 307/9.1 |
| 2012/0181953 A1 | 7/2012 | Hsu et al. |
| 2012/0235636 A1* | 9/2012 | Partovi .................. H02J 7/025 320/108 |
| 2013/0027048 A1 | 1/2013 | Schwarz et al. |
| 2013/0038279 A1 | 2/2013 | Seyerle et al. |
| 2014/0197776 A1 | 7/2014 | Schlaupitz et al. |

(Continued)

*Primary Examiner* — Rami Khatib
(74) *Attorney, Agent, or Firm* — Quinn IP Law

(57) ABSTRACT

Disclosed are control algorithms and system architectures for arbitrating vehicle charging, e.g., for electric vehicles with rechargeable battery packs, wired and wireless charging capabilities, and control logic for governing such charging. A method is disclosed for managing charging of electrical storage units of motor vehicles at vehicle charging stations. The method includes determining if a wireless charging interface of the motor vehicle is available for wireless power transfer, and determining whether or not the vehicle charging station has an electrical connector coupled to a wired charging interface of the motor vehicle. Responsive to the charging station having an electrical connector coupled to the wired charging interface, the method initiates a wired (conductive) charge power mode. Conversely, if the wireless charging interface is available for power transfer and an electrical connector is not coupled to the wired charging interface, the method responsively initiates a wireless (inductive) charge power mode.

20 Claims, 3 Drawing Sheets

(56) References Cited

U.S. PATENT DOCUMENTS

| | | | |
|---|---|---|---|
| 2014/0211345 A1* | 7/2014 | Thompson | B60L 53/68 361/42 |
| 2015/0137755 A1* | 5/2015 | Sadano | B60L 11/1818 320/109 |
| 2016/0052450 A1 | 2/2016 | Chan et al. | |
| 2016/0268833 A1* | 9/2016 | Lee | H02J 50/80 |
| 2016/0285296 A1 | 9/2016 | Namou et al. | |
| 2018/0105053 A1* | 4/2018 | Ahmed | B60L 11/1833 |

\* cited by examiner

VEHICLE ARCHITECTURES, ELECTRICAL SYSTEMS, AND CONTROL ALGORITHMS FOR ARBITRATING VEHICLE CHARGING

The present disclosure relates generally to electrical systems for recharging motor vehicles. More specifically, aspects of this disclosure relate to electric vehicles with a rechargeable battery pack and both wired and wireless charging capabilities.

Current production motor vehicles, such as the modern-day automobile, are originally equipped with a powertrain that operates to propel the vehicle and power the onboard vehicle electronics. A conventional automobile powertrain, for example, is generally comprised of a prime mover that delivers driving power through a multi-speed power transmission to the vehicle's final drive system (e.g., differential, axle, and road wheels). Automobiles have generally been powered by a reciprocating-piston type internal combustion engine (ICE) because of its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and full-electric vehicles, utilize alternative power sources, such as an electric motor-generator, to propel the vehicle and minimize/eliminate reliance on an engine for power and, thus, increase overall fuel economy.

Hybrid vehicles utilize various traction power sources, such as an ICE assembly operating in conjunction with a battery-powered or fuel-cell-powered electric motor, to propel the vehicle. A hybrid electric vehicle (HEV), for example, stores both electrical energy and chemical energy, and converts the same into mechanical power to propel the vehicle and power the vehicle's assorted systems. The HEV is generally equipped with one or more electric machines (E-machine), such as electric motor/generators, that operate individually or in concert with an internal combustion engine to propel the vehicle. Some HEV powertrains utilize a fuel cell stack to supply electric power for the electric traction motors. Since hybrid vehicles are designed to derive their power from sources other than the engine, engines in HEVs may be turned off, in whole or in part, while the vehicle is propelled by the alternative power source(s).

A full electric vehicle (FEV)—colloquially known as "all-electric" vehicles—is an alternative type of electric-drive vehicle configuration that altogether eliminates the internal combustion engine and attendant peripheral components from the powertrain system, relying solely on electric tractive motors for vehicle propulsion. Battery electric vehicles (BEV), for example, utilize energy stored within a rechargeable, onboard battery pack, rather than a fuel tank, fuel cell, or fly-wheel, to power these electric motors. The electric vehicle employs an electrical power distribution system governed via a motor controller for transmitting electrical energy back-and-forth between the onboard battery pack and one or more electric motors. Plug-in electric vehicle (PEV) variations allow the battery pack to be recharged from an external source of electricity, such as a public power grid via a residential or commercial vehicle charging station.

As electric vehicles become more popular and more prevalent, infrastructure is being developed and deployed to make day-to-day use of such vehicles feasible and convenient. Electric vehicle supply equipment (EVSE) comes in many forms, including residential electric vehicle charging stations (EVCS) purchased and operated by a vehicle owner (e.g., installed in the owner's garage), publicly accessible EV charging stations deployed by public utilities or private retailers (e.g., at gas stations or public charging stations), and more sophisticated high-voltage, high-current charging stations used by automobile manufacturers, dealers, and service stations. Plug-in electric vehicles originally equipped with an onboard traction battery pack, for example, can be charged by physically connecting a charging cable of the EVCS to a complementary charging port of the vehicle. Wireless electrical charging systems have also been developed for charging and recharging electric vehicles without the need for charging cables and cable charging ports. Many such wireless charging systems utilize electromagnetic field (EMF) induction techniques to establish an electromagnetic coupling between a charging pad or platform external to the vehicle and a compatible receiver component onboard the vehicle. This receiver component is electrically connected to the rechargeable battery pack to transmit thereto current induced by the external charging pad/platform.

SUMMARY

Disclosed herein are control algorithms and system architectures for arbitrating wired and wireless vehicle charging, methods for making and methods for using such systems, and electric vehicles with both wired and wireless charging capabilities for recharging an onboard electrical storage unit. By way of example, and not limitation, there is presented a novel system architecture and control methodology for arbitrating charge performance for a combination inductive-conductive charging system for hybrid and full-electric vehicles. The control method differentiates between wired and wireless vehicle charging and concomitantly governs the charging event to ensure efficient and robust arbitration of the onboard diagnostics (OBD) of current charging performance. The vehicle's electrical system architecture includes a direct current (DC) coupled, parallel configured inductive/conductive charging system that provides wireless charging power directly to the DC bus utilizing a non-Controller Area Network (CAN) wireless charging interface. Disclosed architectures are designed such that the electric vehicle is configured to accept a wireless charging system with little or no changes to the vehicle's core architecture or software. A charge port door (CPD) sensor may be utilized in various charging modes—alone or in conjunction with proximity fault detection of an EVCS electrical connector—to arbitrate mixed onboard/offboard charging capability and still maintain OBD compliance.

Attendant benefits for at least some of the disclosed concepts include vehicle control logic that enables both wired and wireless vehicle charging while maintaining robust electric charging system diagnostics for both types of charging with mixed charging power levels. Disclosed systems, methods and devices allow a wireless charging system to be coupled directly to the DC bus to help maintain high levels of charging efficiency and high levels of overall system robustness for a vehicle originally equipped with a wired charging system. Other attendant benefits may include mixed wireless charging system architectures that help to resolve charging interoperability issues. Disclosed electrified powertrain architectures also enable a motor vehicle to be retrofit with an aftermarket or OEM "after the fact" wireless charging system while ensuring timely and efficient charging and still maintaining multilevel charging system diagnostics for mixed power levels and mixed charging technologies.

Aspects of the present disclosure are directed to control logic and computer-executable algorithms for arbitrating wired and wireless charging of motor vehicles. Disclosed, for example, is a method for managing charging of an electrical storage unit of a motor vehicle, such as a rechargeable traction battery pack of a hybrid or full-electric vehicle at a vehicle charging station. The motor vehicle is equipped with a wireless charging interface, such as an inductive receiver pad, and wired charging interface, such as an electrical connector charge port, both of which are electrically coupled to the vehicle's electrical storage unit. This method includes, in any order and in any combination with any of the disclosed features and options: determining, via an onboard vehicle controller, if the wireless charging interface of the motor vehicle is available for wireless power transfer (e.g., is an inductive receiver pad present and, if so, is the pad operatively aligned with a wireless charging platform of the vehicle charging station); determining, via the onboard vehicle controller, whether or not the vehicle charging station has an electrical connector and/or is the electrical connector operatively mated with the motor vehicle's wired charging interface; responsive to the vehicle charging station having an electrical connector that is coupled to the vehicle's wired charging interface, initiating a wired (conductive) charge fixed power mode; and, responsive to the vehicle's wireless charging interface being available for power transfer, initiating a wireless (inductive) charge fixed power mode.

For at least some applications, determining if a charging station's electrical connector is coupled to the motor vehicle's wired charging interface includes determining whether a charge port door (CPD) of the motor vehicle is in an open state or a closed state. Optionally, determining if a charging station's electrical connector is coupled to the motor vehicle's wired charging interface includes detecting a proximity fault introduced by the electrical connector to the electrical circuit connecting the wired charging interface to the electrical storage unit. In at least some embodiments, initiating the wireless/inductive charge power mode is also responsive to a determination that a detected proximity voltage of the electrical connector is approximately equal to a first "connected with trigger pressed" calibrated voltage value. Comparatively, initiating the wired/conductive charge power mode may be further responsive to a determination that the detected proximity voltage of the electrical connector is approximately equal to a second "disconnected" calibrated voltage value or a third "connected with trigger not pressed" calibrated voltage value, both of which are different from the first calibrated voltage value. In response to a conductive charge power mode being initiated, the method may further configure the vehicle's charging controls and diagnostic parameters to preset conductive charging limits. By way of comparison, in response to an inductive charge power mode being initiated, the method may further configure the vehicle's charging controls and diagnostic parameters to preset inductive charging limits.

Other aspects of the present disclosure are directed to electric vehicles equipped with a rechargeable electrical storage unit, wired and wireless charging capabilities, and control logic for arbitrating such electric recharging. A "motor vehicle," as used herein, may include any relevant vehicle platform, such as passenger vehicles (internal combustion engine, hybrid electric, full electric, fuel cell, fuel cell hybrid, fully or partially autonomous, etc.), commercial vehicles, industrial vehicles, tracked vehicles, off-road and all-terrain vehicles (ATV), farm equipment, boats, airplanes, etc. In an example, a motor vehicle is presented that includes a vehicle body with road wheels, and a traction motor operable to drive one or more of the road wheels and thereby propel the vehicle. A traction battery pack is mounted to the vehicle body and electrically coupled to the traction motor. The vehicle also includes a charge port and a wireless charging receiver component, both of which are electrically coupled to the traction battery pack. The charge port electrically mates with an electrical connector of an electric vehicle charging station (EVCS), whereas the wireless charging receiver component operably couples with a wireless charging platform of the EVCS.

The motor vehicle also includes a vehicle controller that is attached to the vehicle body and communicatively connected to the vehicle's various charging components. This vehicle controller, which may comprise one or more subsystem control modules, is programmed to determine if the wireless charging receiver component is available for wireless power transfer, and determine if the charge port is electrically mated with the electrical connector of the EVCS. Responsive to a determination that the charge port is electrically mated with the electrical connector, the vehicle controller is programmed to initiate a conductive charge fixed power mode. On the other hand, in response to a determination that the charge port is not electrically mated with the electrical connector and/or a determination that the wireless charging receiver is available for power transfer, the vehicle controller is programmed to initiate an inductive charge fixed power mode.

Additional aspects of the present disclosure are directed to non-transitory, computer readable media storing instructions for execution by at least one of one or more processors of at least one of one or more in-vehicle electronic control units. In an example, these instructions are stored in resident memory and executable by an onboard vehicle controller of an electric vehicle. These instructions, when executed, cause the ECU(s) to perform various steps, including: determining if the wireless charging interface of the motor vehicle is available for wireless power transfer; determining whether or not the vehicle charging station has an electrical connector coupled to the wired charging interface of the motor vehicle; responsive to a determination that the vehicle charging station has an electrical connector coupled to the wired charging interface, initiating a conductive charge fixed power mode; and responsive to a determination that the wireless charging interface is available for power transfer, initiating an inductive charge fixed power mode. The computer readable media may further store any or all of the other operations disclosed herein above and below.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

Figure 1:
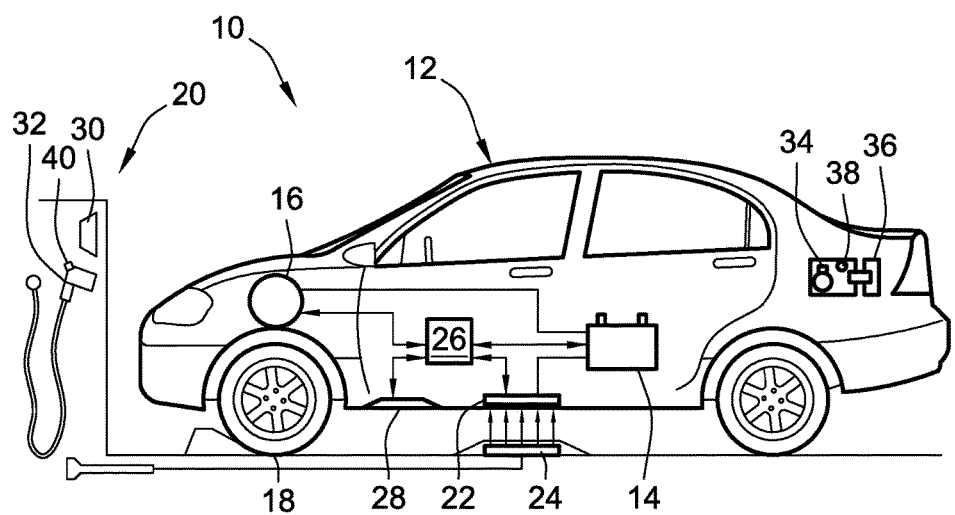
FIG. 1 is a partially schematic, side-view illustration of a representative motor vehicle that is equipped with both wired and wireless charging capabilities and is operably coupled to a representative electric vehicle charging station in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Aspects of the present disclosure are directed to electric-drive vehicles, including all-electric, hybrid electric, fuel cell, plug-in, etc., with a rechargeable electrical storage unit and a DC-coupled, parallel configured inductive/conductive charging system. These electric-drive vehicles are equipped with control logic for arbitrating vehicle charging, e.g., to achieve high fidelity charge performance with mixed onboard chargers. Utilization of a charge port door sensor, singly or in conjunction with proximity fault detection of an EVCS electrical connector, provides charge system status feedback for passive and active efficiency calculations. Doing so that helps to enable mixed power and efficiency charging modes to maintain OBD compliance, especially for aftermarket and OEM add-on wireless charging systems. Disclosed control logic helps to ensure lesser efficient charging systems, such as an onboard inductive (wireless) charging system, can maintain levels of robustness with those that are more efficient, such as an onboard conductive (plug-in) charging system. Disclosed architectures allow for robust differentiation in charge performance for mixed power levels without the need for the vehicle to identify the charge type.

Utilization of a CPD sensor for arbitrating charge performance and for differentiating charge type helps to provide the vehicle's charging control system with user input to determine which charge type and which charge setting to use by the charging control system. In the same vein, utilization of an EVCS electrical connector switch for arbitrating charge performance and for differentiating charge type helps to provide the vehicle's charging control system with user input to enable inductive charging mode for a charge event. Incorporation of the connector switch and CPD sensor helps to provide both inductive and conductive charging modes while preventing tampering by a third party. For at least some configurations, the inductive charging subsystem utilizes a non-CAN high voltage direct current (HVDC) bus coupling interface, e.g., that is operable to emulate SAE-standardized electrical connector communication with added sensing for emulating an onboard charge module (OBCM). With this approach, the onboard vehicle charging system can provide active and passive charge performances for inductive charging that mimics conductive charging. Other attendant benefits may include active and passive efficiency calculations for inductive charging systems for onboard mixed charge power levels and variations in charging efficiencies due to a combo inductive and conductive vehicle charging system.

Referring now to the drawings, wherein like reference numbers refer to like features throughout the several views, there is shown in FIG. 1 a schematic illustration of a representative automobile, which is designated generally at 10 and portrayed herein for purposes of discussion as a four-door, electric-drive (full or hybrid) vehicle. Packaged within a vehicle body 12 of the automobile 10, e.g., within a passenger compartment, a trunk compartment, or a dedicated battery compartment, is a traction battery pack 14 that is electrically coupled to and powers one or more electric motor-generators 16 that operate to turn one or more of the vehicle's road wheels 18 and thereby propel the vehicle 10. The illustrated automobile 10—also referred to herein as "motor vehicle" or "vehicle" for short—is merely an exemplary application with which many aspects and features of this disclosure may be practiced. In the same vein, implementation of the present concepts for the specific electric vehicle supply equipment (EVSE) architecture illustrated in FIG. 1 should also be appreciated as an exemplary application of the concepts and features disclosed herein. As such, it will be understood that aspects and features of this disclosure may be applied to other types of EVSE, and implemented for any logically relevant type of motor vehicle. Moreover, only select components of the vehicle and EVSE have been shown and will be described in additional detail herein. Nevertheless, the motor vehicles and EVSE architectures discussed below can include numerous additional and alternative features, and other well-known peripheral components, for example, for carrying out the various methods and functions of this disclosure. Lastly, the drawings presented herein are not to scale and are provided purely for instructional purposes. Thus, the specific and relative dimensions shown in the drawings are not to be construed as limiting.

FIG. 1 is a simplified illustration of the electric-drive vehicle 10 docked at and operably coupled to a vehicle charging station 20 for recharging an onboard rechargeable energy source, such as a high-voltage direct current (DC) traction battery pack 14 with an array of lead-acid, lithium-ion, or other applicable type of rechargeable electric vehicle batteries (EVB). To provide this operable coupling, the vehicle 10 may include an inductive charging component 22, e.g., with an integrated induction coil, that is mounted to the vehicle body 12. This inductive charging component 22 functions as a wireless charging interface that is compatible with a wireless charging pad or platform 24, e.g., with an internal EMF coil, of the vehicle charging station 20. In the illustrated example, the wireless charging pad/platform 24 is located on the ground or floor of the vehicle charging station 20, and is positioned in accordance with a "target location" that serves as a desired parking location, e.g., for purposes of efficient and effective wireless charging of the vehicle 10. In particular, FIG. 1 depicts the vehicle 10 parked in a location that helps to ensure the inductive charging component 22 is substantially or completely aligned in both lateral and longitudinal dimensions with the wireless charging pad 24. Put another way, the vehicle 10 in FIG. 1 is considered to be in proper fore-aft alignment and in proper starboard-port alignment with a designated target location to complete an inductive charging event for the vehicle.

The vehicle charging station 20 may employ any heretofore and hereinafter developed type of wireless charging technology, including inductive charging, radio charging, and resonance charging, as some non-limiting examples. In accordance with electromagnetic induction charging technology, the representative wireless charging pad 24 of FIG. 1 can be activated with electric current to generate an alternating electromagnetic field proximate the inductive charging component 22. The generated magnetic field, in turn, induces an electric current in the inductive charging component 22 of the vehicle 10. This induced current is used to charge the traction battery pack 14 or other energy source (e.g., a standard 12V lead-acid starting, lighting, and ignition (SLI) battery, an auxiliary power module, etc.) of the vehicle 10. As mentioned previously, the optimal wireless charging performance may be obtained when the inductive charging component 22 is properly aligned with the wireless charging pad 24.

Traction battery pack 14 stores energy that can be used for propulsion by the electric machine(s) 16 and for operating other vehicle electrical systems. The traction battery pack 14 is communicatively connected (wired or wirelessly) to one or more vehicle controllers, represented in FIG. 1 by electronic control unit (ECU) 26, that regulates the operation of various onboard vehicle components. Contactors controlled by the ECU 26, for example, may isolate the traction battery pack 14 from other components when opened, and connect the traction battery pack 14 to other components when closed. The ECU 26 is also communicatively connected to the electric motor-generator(s) 16 to control, for example, bi-directional transfer of energy between the traction battery pack 14 and each motor-generator 16. For instance, traction battery pack 14 may provide a DC voltage while the motor-generator(s) 16 may operate using a three-phase AC current; in such an instance, ECU 26 converts the DC voltage to a three-phase AC current for use by the motor-generator(s) 16. In a regenerative mode where the electric machine(s) 16 act as generators, the ECU 26 may convert three-phase AC current from the motor-generator(s) 16 to DC voltage compatible with the traction battery pack 14. The representative ECU 26 is also shown communicating with charging component 22, for example, to condition the power supplied from the vehicle charging station 20 to the battery pack 14 to help ensure proper voltage and current levels. The ECU 26 may also interface with the charging station 20, for example, to coordinate the delivery of power to the vehicle 10.

Vehicle charging station 20 of FIG. 1 also offers wired charging for electric vehicle 10 via a "plug-in" electrical connector 32, which may be one of a number of different commercially available electrical connector types. By way of non-limiting example, electrical connector 32 may be a Society of Automotive Engineers (SAE) J1772 (Type 1) or J1772-2009 (Type 2) electrical connector with single or split phase modes operating at 120 to 240 volts (V) with alternating current (AC) at up to 80 amperes (A) peak current for conductive vehicle charging. Furthermore, the charging connector 32 can also be designed to meet the standards set forth in International Electrotechnical Commission (IEC) 62196-3 Fdis and/or IEC 62196-2, as well as any other presently available or hereinafter developed standards. A charge port 34 accessible on the exterior of vehicle body 12 is a wired charging interface functioning as an electrical inlet into which electrical connector 32 can be plugged or otherwise mated. This port 34 enables a user to easily connect and disconnect electric vehicle 10 to/from a readily available AC or DC source, such as a public utility power grid via charging station 20. Charge port 34 of FIG. 1 is not limited to any particular design, and may be any type of inlet, port, connection, socket, plug, etc., that enables conductive or other types of electrical connections. A hinged charge port door (CPD) 36 on vehicle body 12 can be selectively opened and closed to access and cover the charge port 34, respectively.

As part of the vehicle charging process, the electric-drive vehicle 10 may monitor wired/wireless charging availability, wireless power quality, and other related issues that may affect vehicle charging. According to the illustrated example, the vehicle ECU 26 of FIG. 1 communicates with and receives sensor signals from a monitoring system, which may comprise one or more onboard "resident" sensing devices 28 of the vehicle 10 and/or one or more off-board "remote" sensing devices 30 of the vehicle charging station 20. In practice, this monitoring system may include a single sensor, or it may include a distributed sensor architecture with an assortment of sensors packaged at similar or alternative locations to that shown in the drawings. The illustrated onboard and off-board sensing devices 28, 30 are operable, independently or through cooperative operation, to detect the intrusion of living obstructions, non-living foreign objects, vandals, thieves, etc., that may intrude during or impact a charging event. A CPD sensor 38 mounted by the charge port 34 may sense, and be polled or read by the vehicle's ECU 26 to determine, a door status—opened or closed—of the CPD 36. As another option, a latching button 40 that helps to physically attach and secure the electrical connector 32 to the charge port 34 may include an internal switch (e.g., an SAE S3 type switch) that functions as a sensing device to detect whether or not the electrical connector 32 is operatively connected to the charge port 34. There are numerous other types of sensing devices that can also be used, including, for example, thermal sensing devices, such as passive thermal infrared sensors, optical sensing devices, such as light- and laser-based sensors, acoustic sensing devices, such as surface acoustic wave (SAW) and ultrasonic sensors, capacitive sensing devices, such as capacitive-based proximity sensors, etc.

Figure 2:
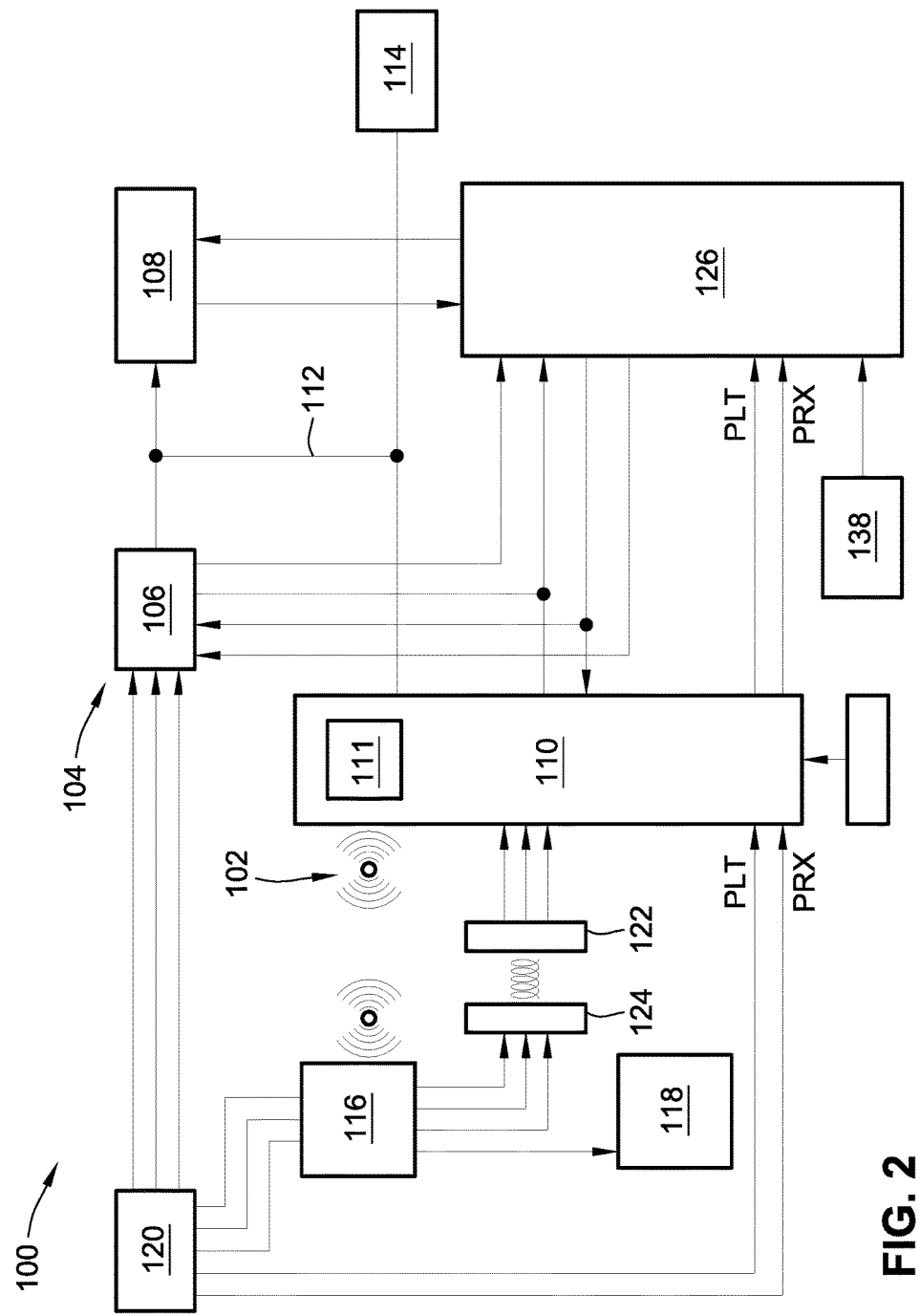
FIG. 2 is a schematic diagram of a representative vehicle electric system architecture with inductive and conductive charging systems operable for charging a rechargeable energy storage unit in accord with aspects of the disclosed concepts.

FIG. 2 is a more detailed diagrammatic illustration of the architecture of a representative electrical system 100 of a motor vehicle, such as electric vehicle 10 of FIG. 1, which is equipped with both an inductive and a conductive charging subsystem 102 and 104, respectively. According to the illustrated example, the conductive charging subsystem 104 includes an onboard charging module (OBCM) 106 that functions, in part, to regulate and monitor a wired charging event, and communicate such information to other networked vehicle controllers. The OBCM 106 may also function as an AC-DC converter to convert an AC charging voltage from an off-board AC power supply 120, such as vehicle charging station 20 or other available EVSE, into a DC voltage suitable for use by a DC battery pack (e.g., traction battery pack 14 of FIG. 1) or other rechargeable energy storage subsystem (RESS) 108. The OBCM 106 is electrically interposed between a charge coupler (e.g., electrical connector 32) of the AC power supply 120 and the RESS 108. For at least some system applications, the OBCM 106 includes internal solid-state electronic components that work in concert to convert a voltage output from the AC power supply 120 into a DC voltage input. Although omitted for illustrative simplicity, such internal structure may include one or more microprocessors, input and output waveform filters, passive diode bridges, semiconductor switches, such as MOSFETs or IGBTs, a link capacitor, and a transformer, as non-limiting examples.

With continuing reference to FIG. 2, the inductive charging subsystem 102 includes a wireless charging module (WCM) 110 for regulating a wireless charging event of the motor vehicle. As with the conductive charging system's OBCM 106, the inductive charging system's WCM 110 is DC-coupled to the RESS 108 and an auxiliary power module (APM) 114 via an HVDC bus 112. The wireless charging module 110, which is shown connected in electrical parallel with the OBCM 106, includes an inductive control module (ICM) 111, which may be embodied as a printed circuit board (PCB) assembly that includes sensing and communication hardware and software necessary for interfacing with a vehicle controller (e.g., ECU 26 of FIG. 1) and the off-board power supply 120. The ICM 111 may include a radio frequency (RF) transceiver or other wireless communication interface, and may be configured to utilize existing vehicle wireless communications, telematics, etc., to provide intended functionality. The ICM 111 selectively receives a proximity signal (arrow PRX in FIG. 2) and control pilot signal (arrow PLT in FIG. 2), with the pilot and proximity signals being both an input and output for the ICM 111 and the proximity signal being an input for sensing the occurrence of a plug-in event, as described below.

Comparable to the inductive charging component 22 of vehicle 10 described above with respect to FIG. 1, the inductive charging subsystem 102 of FIG. 2 includes an inductive receiver coil 122 that functions as a wireless charging interface to electromagnetically couple with a primary induction coil 124 of off-board power supply 120. Power from the off-board power supply 120, typically transmitted at 230 V/50 Hz or 110 V/60 Hz, is converted via operation of a wireless continuous phase modulation (CPM) device 116 into a relatively high-frequency signal, e.g., via pulse-width modulation, with the wireless charging circuit providing any necessary power factor correction. A wireless charging alignment aid 118 may wireless communicate with the ICM 111, e.g., through CPM 116, to help the vehicle controller determine if the vehicle is in proper fore-aft and/or starboard-port alignment with a designated target location to complete an inductive charging event for the vehicle. Once sufficiently aligned, the wireless charging circuit outputs, e.g., a 120 VAC or 240 VAC pulsed AC voltage signal, to the primary coil 124 at a low frequency, e.g., typically about 20-100 KHz. The WCM 110 then rectifies and filters the induced AC current, with a resultant DC current supplied through the HVDC bus 112 to charge the RESS 108 and an auxiliary battery of APM 114 and, optionally, to power other vehicle components and modules. A vehicle integrated control module (VICM) 126 performs various control and communication related functions for completing any of the disclosed charging operations. Depending on the intended application, OBCM 106, WCM 110 and VICM 126 may each be a stand-alone electronic module, as shown, or each may be incorporated within another electronic module in the vehicle (e.g., a powertrain control module, a hybrid control module, etc.), or the various illustrated modules may integrated into a larger network or system.

Figure 3:
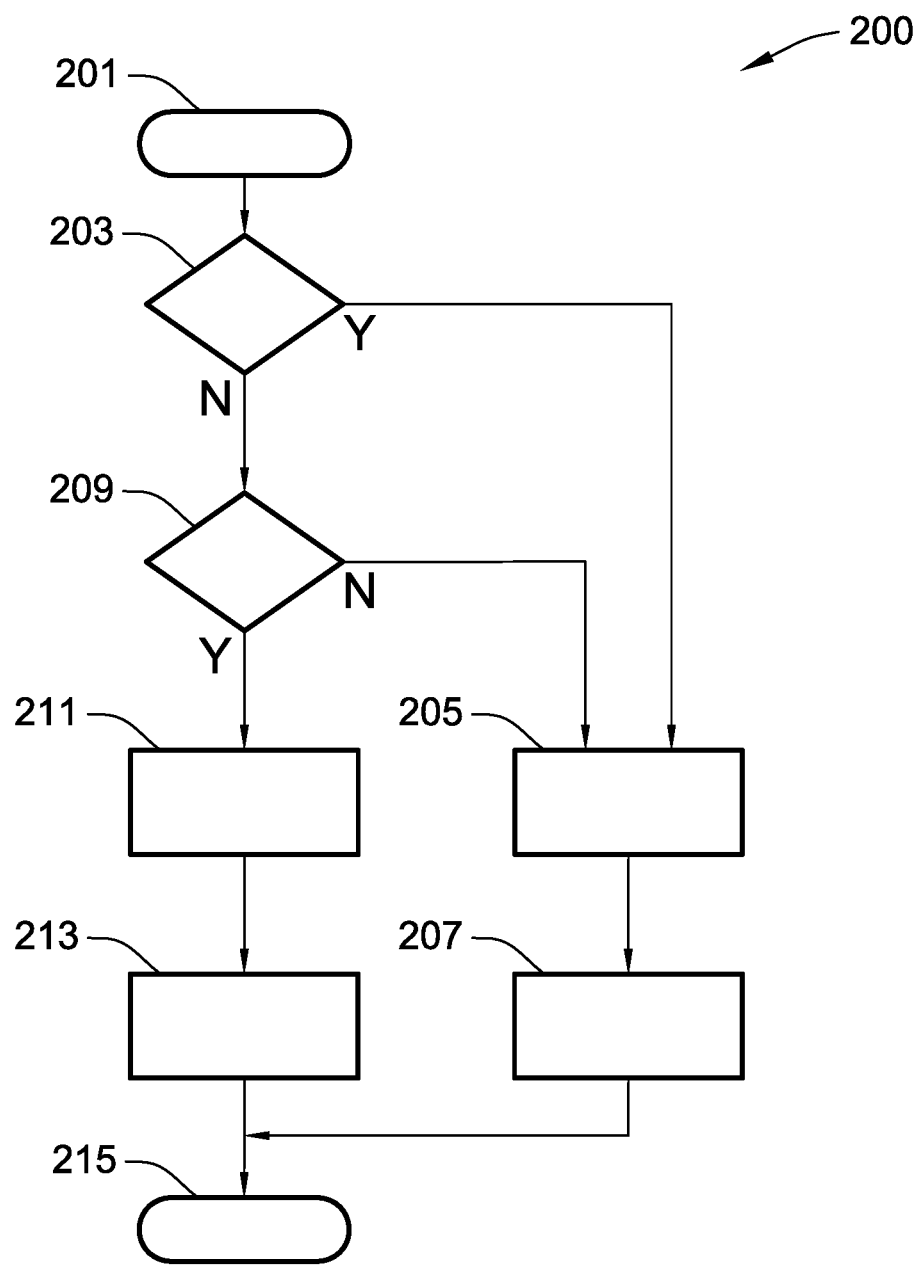
FIG. 3 is a flowchart for a representative wired and wireless vehicle charging protocol that may correspond to instructions executed by onboard control-logic circuitry, programmable electronic control unit, or other computer-based device of a motor vehicle in accord with aspects of the disclosed concepts.

With reference now to the flow chart of FIG. 3, an improved method or control strategy for arbitrating wired and wireless vehicle charging of a motor vehicle, such as electric-drive vehicle 10 of FIG. 1, with electric vehicle supply equipment, such as vehicle charging station 20 of FIG. 1, for example, is generally described at 200 in accordance with aspects of the present disclosure. Some or all of the operations illustrated in FIG. 3 and described in further detail below can be representative of an algorithm that corresponds to processor-executable instructions that can be stored, for example, in main or auxiliary or remote memory, and executed, for example, by an ECU, a central processing unit (CPU), a resident or remote control logic circuit, or other device or combination of devices, to perform any or all of the above and/or below described functions associated with the disclosed concepts.

Method 200 of FIG. 3 starts at terminal block 201 with initiating a wireless power transfer (WPT) charging arbitration protocol. In essence, terminal block 201 could be replaced with a decision block for the vehicle charging system to assess whether or not the WPT protocol is needed. For instance, the vehicle controller—ECU 26 of FIG. 1 or one or more of the control modules of FIG. 2, such as WCM 110 or VICM 126—may execute memory stored instructions to determine if a wireless charging interface of the motor vehicle is present and/or available for wireless power transfer. By way of non-limiting example, a motor vehicle executing method 200 may not be equipped with a wireless charging subsystem or may have a malfunctioning wireless charging subsystem; in such cases, the method 200 may be deemed superfluous and, thus, may be terminated. As another example, the wireless charging interface may be deemed "available" and, thus, the WPT charging arbitration protocol may be initiated after determining that the vehicle is positioned in accordance with a "target location" for effective wireless charging. Specifically, a vehicle controller (e.g., ECU 26) or control module (e.g., WCM 110) identifies a proximity of the vehicle's wireless charging interface relative to the EVSE's wireless charging interface (e.g., a location of inductive receiver coil 122 relative to primary induction coil 124 based on monitoring data received from alignment aid 118). Once identified, the vehicle controller will assess if the proximity of the vehicle's charging interface is sufficiently aligned with the EVSE's charging interface to perform wireless power transfer. If so, the ECU 26 may responsively proceed with WPT charging arbitration protocol. If not, the charging arbitration protocol is stopped.

After the WPT charging arbitration protocol is initiated at block 201, the method 200 continues to block 203 to determine whether or not the vehicle charging station has an electrical connector and/or whether an electrical connector is coupled to the vehicle's wired charging interface, e.g., such that plug-in charging may be commenced. For instance, a motor vehicle with both plug-in and inductive charging capabilities may dock at an EVCS that does not have plug-in charging hardware (e.g., an EVCS configured solely as a wireless electric vehicle charging (WEVC) platform) and/or has a plug-in electrical connector that is malfunctioning. In such an instance, the determination conducted at block 203 may come back false (Block 203=NO), and the method would proceed to decision block 209 to determine whether or not to initiate a wireless charging subroutine. For some implementations, it may be assumed that the EVSE is equipped with a properly functioning plug-in electrical connector; in such an instance, decision block 203 may be limited to detecting if the electrical connector (e.g., plug-in electrical connector 32) is operatively coupled to the vehicle's wired charging interface (e.g., charge port 34 of FIG. 1). Vehicle ECU 26 of FIG. 1, for example, may be programmed to execute stored instructions to assess the status of the electrical connector—connected or disconnected—by determining whether the charge port door (CPD) 36 of the motor vehicle 10 is in an open state or a closed state. As described above, the CPD 36 includes a CPD sensor 38 that may be actuated to generate and transmit to the vehicle ECU 26 one or more signals indicative of the CPD being in an open state, exposing the charge port 34 (as shown), or a closed state, covering and concealing the charge port 34. If the CPD sensor 38 detects that the CPD 36 is closed, then it may be assumed that the electrical connector 32 cannot be operatively connected to the charge port 34. Conversely, when the CPD sensor 38 detects that the CPD 36 is opened, then it may be assumed that the electrical connector 32 is or will be operatively connected to the charge port 34.

An optional addition to, or alternative for, detecting the status of the CPD 36 in order to determine if an electrical connector is coupled to the vehicle's wired charging interface at process block 203 includes detecting a proximity fault condition that is introduced by the electrical connector to the electrical circuit connecting the vehicle's wired charging interface to the vehicle's electrical storage unit. Plug-in electrical connector 32 of FIG. 1, for example, includes a latching button 40 for physically securing the connector 32 to the charge port 34. As discussed above, depressing this button 40 also functions to activate an internal electrical switch that triggers or otherwise creates the proximity fault in the vehicle's wired charging subsystem. If the connector 32 is inserted into the charging port 34 and the latching button 40 is depressed, for example, a control pilot and proximity detection pin will break, which causes a power relay in the vehicle charging station 20 to open, cutting current flow to the connector 32. Once the latching button 40 is released, current flow can be reestablished. The button 40 is also connected to a switch that is triggered upon pressing the physical disconnect button when inserting or removing the electrical connector 32 from the charge port 34. This causes the resistance to change on the proximity pin, which may operate as a command to the vehicle's WCM 110 to stop drawing current, e.g., before the connector is removed.

If it is determined at decision block 203 that the electrical connector 32 of vehicle charging station 20 is properly mated with the charge port 34 of vehicle 10—the CPD 36 is open and/or the latching button 40 is/was depressed to create a proximity fault (Block 203=YES), the method 200 responds at process block 205 with initiating a wired (conductive) charge power mode. AC grid power may be relayed via the charging station 20 to the vehicle 10 at 120 or 240 VAC, for example. A positive response at block 203 of FIG. 3 may also require confirming that the latching button 40 is/was not being depressed for an inordinately long period of time. A continuously (as opposed to briefly) depressed button 40, which creates a prolonged proximity fault signal, may be designated as an indication that inductive charging, rather than conductive charging, is desired by the user. A visual or audible prompt may be transmitted to the user to confirm that wired charging is desired prior to initiating wired charging. Once initiated, the method 200 may proceed to block 207 with programmable instructions that cause the ECU 26, OBCM 106 and/or VICM 126 to configure the vehicle's charging controls and diagnostic parameters to correspond with conductive charging limits calibrated for the motor vehicle 10. After the plug-in charging event is completed, the method 200 may proceed to terminal block 215 and temporarily terminate.

With continuing reference to FIG. 3, when decision block 203 returns a false assessment (block 203=NO), the method 200 proceeds to block 209 to determine whether or not to initiate a wireless (inductive) charging subroutine. For at least some system configurations, block 209 may return a positive response (Block 209=YES) and automatically initiate a wireless (inductive) charge power mode at block 211 solely by confirming that the vehicle 10 is not plugged into the vehicle charging station 20. For instance, block 209 may merely require confirming that the CPD 36 is closed (e.g., for a prolonged period of time) after the vehicle 10 docks at vehicle charging station 20. As mentioned above, CPD sensor 38 signals indicating that the CPD 36 is closed and suggests that the electrical connector 32 is not operatively connected to the charge port 34 which may also suggest that wireless charging is desired by the user. Optionally, block 209 may further require determining that the vehicle 10 is equipped with a wireless charging system and/or a wireless charging interface of the vehicle 10 is available for power transfer. Responsive to a determination that: (1) the vehicle charging station does not have an electrical connector; (2) a charging station electrical connector is not coupled to the vehicle's wired charging interface; and/or (3) the vehicle has a wireless charging subsystem with a wireless charging interface that is available for power transfer (Block 209=YES), the method 200 may automatically respond by initiating a wireless charge power mode at block 211. Optionally, a visual or audible prompt may be transmitted to the user to confirm that wireless charging is desired prior to initiating wireless charging. Once initiated, the method 200 may proceed to block 213 with programmable instructions that cause the ECU 26, WCM 110 and/or VICM 126 to configure the vehicle's charging controls and diagnostic parameters to correspond with inductive charging limits calibrated for the motor vehicle 10. After the inductive charging event is completed, the method 200 may proceed to terminal block 215 and terminate.

Decision block 209 may also, or alternatively, return a positive response (Block 209=YES) and proceed to block 211 when an electrical connector is operatively coupled to the vehicle wired charging interface after confirming that a proximity fault condition has been introduced by the electrical connector for a prolonged period of time. For instance, the vehicle ECU 26, WCM 110 and/or VICM 126 may be programmed to monitor, assess or otherwise determine a duration of time during which the latching button 40 is/was depressed while the electrical connector 32 is coupled to the charge port 34 of the motor vehicle 10. If the monitored duration of time is greater than a calibrated time period (e.g., 20 seconds), the method 200 may responsively initiate a wireless (inductive) charge power mode at block 211. As previously noted, a continuously depressed button 40, which creates a prolonged proximity fault signal, may be designated as an indication that inductive charging is desired by the user.

Blocks 203 and/or 209 may also, or alternatively, include detecting a proximity voltage, e.g., to detect the presence/absence of the charge connector for arbitrating between wireless (inductive) and wired (conductive) charging. If the detected proximity voltage is approximately equal to a first calibrated voltage value (e.g., between approximately 2.2 and 3.3 volts), the method 200 may respond, e.g., at block 209, by initiating the wireless charge power mode. Comparatively, if the detected proximity voltage of the electrical connector is approximately equal to a second calibrated voltage value (e.g., between approximately 1.1 and 1.9 volts), the method 200 may respond, e.g., at block 203, by initiating the wired charge power mode. On the other hand, if the detected proximity voltage of the electrical connector is approximately equal to a third calibrated voltage value (e.g., between approximately 4.1 and 4.9 volts), the method 200 may respond, e.g., at block 209, by initiating the wireless charge power mode.

Aspects of this disclosure may be implemented, in some embodiments, through a computer-executable program of instructions, such as program modules, generally referred to as software applications or application programs executed by an onboard vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

What is claimed:

1. A method for managing charging of an electrical storage unit of a motor vehicle at a vehicle charging station, the motor vehicle having wireless and wired charging interfaces both electrically connected to the electrical storage unit, the method comprising:
   determining, via a vehicle controller, if the wireless charging interface of the motor vehicle is available for wireless power transfer, including determining if the wireless charging interface is present, malfunctioning, and/or operatively aligned for wireless power transfer;
   determining, via the vehicle controller, whether or not the vehicle charging station has an electrical connector and/or the electrical connector is coupled to the wired charging interface of the motor vehicle, the electrical connector including a button configured to physically secure the electrical connector to the wired charging interface;
   responsive to the electrical connector being coupled to the wired charging interface, determining a duration of time during which the button is depressed;
   responsive to a determination that the vehicle charging station has the electrical connector and/or the electrical connector is coupled to the wired charging interface, initiating a wired charge power mode; and
   responsive to a determination that the wireless charging interface is available for power transfer and a determination that the duration of time the button is depressed is greater than a calibrated time period, initiating a wireless charge power mode.

2. The method of claim 1, wherein determining whether or not the electrical connector is coupled to the wired charging interface includes determining whether a charge port door (CPD) of the motor vehicle is in an open state or a closed state.

3. The method of claim 2, wherein the CPD includes a CPD sensor operable to transmit to the vehicle controller a signal indicative of the CPD being in the open state or the closed state.

4. The method of claim 1, wherein determining whether or not the electrical connector is coupled to the wired charging interface includes detecting a temporary fault introduced by the electrical connector to an electrical circuit connecting the wired charging interface to the electrical storage unit.

5. The method of claim 4, wherein depressing and releasing the button of the electrical connector activates an electrical switch that triggers the temporary fault.

6. The method of claim 1, further comprising:
   detecting a voltage of the electrical connector, wherein initiating the wireless charge power mode is further responsive to a determination that the detected voltage of the electrical connector is approximately equal to a first calibrated voltage value.

7. The method of claim 6, wherein initiating the wired charge power mode is further responsive to a determination that the detected voltage of the electrical connector is approximately equal to a second calibrated voltage value different from the first calibrated voltage value.

8. The method of claim 1, further comprising, responsive to initiating the wired charge power mode, configuring vehicle charging controls and diagnostic parameters to conductive charging limits.

9. The method of claim 1, further comprising, responsive to initiating the wireless charge power mode, configuring vehicle charging controls and diagnostic parameters to inductive charging limits.

10. The method of claim 1, wherein the vehicle charging station includes a wireless charging platform, wherein determining if the wireless charging interface is operatively aligned and thereby available for wireless power transfer includes determining a location of the wireless charging interface relative to the charging platform, and wherein initiating the wireless charge power mode is further responsive to a determination that the location of the wireless charging interface is aligned with the charging platform to perform wireless power transfer.

11. The method of claim 1, wherein the wireless and wired charging interfaces are electrically connected in parallel to the electrical storage unit, and wherein the wired charging interface is communicatively coupled to the vehicle controller via a Controller Area Network (CAN) interface, and the wireless charging interface is communicatively coupled to the vehicle controller via a non-CAN high voltage direct current (HVDC) interface.

12. The method of claim 1, wherein initiating the wireless charge power mode is further responsive to a determination that the vehicle charging station does not have the electrical connector and/or a determination that the vehicle charging station has the electrical connector and the electrical connector is not coupled to the wired charging interface.

13. An electric-drive vehicle comprising:
a vehicle body;
a plurality of road wheels attached to the vehicle body;
a traction motor attached to the vehicle body and operable to drive at least one of the road wheels and thereby propel the electric-drive vehicle;
a traction battery pack attached to the vehicle body and electrically coupled to the traction motor;
a charge port electrically coupled to the traction battery pack and configured to electrically mate with an electrical connector of an electric vehicle charging station (EVCS);
a wireless charging receiver component electrically coupled to the traction battery pack and configured to operably couple with a wireless charging platform of the EVCS; and
a vehicle controller attached to the vehicle body and programmed to:
determine if the wireless charging receiver component is available, including determining if the wireless charging receiver component is present, malfunctioning, and/or operatively aligned for wireless power transfer;
determine if the charge port is electrically mated with the electrical connector of the EVCS, the electrical connector including a button configured to physically secure the electrical connector to the charge port;
responsive to the electrical connector being mated with the charge port, determine a duration of time during which the button is depressed;
responsive to a determination that the charge port is electrically mated with the electrical connector, initiate a conductive charge fixed power mode; and
responsive to a determination that that the wireless charging receiver component is available for power transfer and a determination that the duration of time the button is depressed is greater than a calibrated time period, initiate an inductive charge fixed power mode.

14. A non-transitory, computer readable medium storing instructions for execution by an onboard vehicle controller of a motor vehicle with an electrical storage unit, the motor vehicle having wireless and wired charging interfaces both electrically connected to the electrical storage unit and both configured to operably couple with a vehicle charging station, the instructions causing the vehicle controller to perform steps comprising:
determining if the wireless charging interface of the motor vehicle is available for wireless power transfer, including determining if the wireless charging interface is present, malfunctioning, and/or operatively aligned for wireless power transfer;
determining whether or not the vehicle charging station has an electrical connector and/or the electrical connector is coupled to the wired charging interface of the motor vehicle, the electrical connector including a button configured to physically secure the electrical connector to the wired charging interface;
responsive to the electrical connector being coupled to the wired charging interface, determining a duration of time during which the button is depressed;
responsive to a determination that the vehicle charging station has the electrical connected and/or the electrical connector is coupled to the wired charging interface, initiating a wired charge power mode; and
responsive to a determination that the wireless charging interface is available for power transfer and a determination that the duration of time the button is depressed is greater than a calibrated time period, initiating a wireless charge power mode.

15. The non-transitory, computer readable medium of claim 14, wherein determining whether or not the electrical connector is coupled to the wired charging interface includes determining whether a charge port door (CPD) of the motor vehicle is in an open state or a closed state.

16. The non-transitory, computer readable medium of claim 14, wherein determining whether or not the electrical connector is coupled to the wired charging interface includes detecting a temporary fault introduced by the electrical connector to an electrical circuit connecting the wired charging interface to the electrical storage unit.

17. The non-transitory, computer readable medium of claim 14, further comprising instructions causing the vehicle controller to detect a voltage of the electrical connector, wherein initiating the wireless charge power mode is further responsive to a determination that the detected voltage of the electrical connector is approximately equal to a first calibrated voltage value.

18. The non-transitory, computer readable medium of claim 14, further comprising instructions causing the vehicle controller to, responsive to initiating a wired charge power mode, configure vehicle charging controls and diagnostic parameters to conductive charging limits.

19. The non-transitory, computer readable medium of claim 14, further comprising instructions causing the vehicle controller to, responsive to initiating a wireless charge power mode, configure vehicle charging controls and diagnostic parameters to inductive charging limits.

20. The non-transitory, computer readable medium of claim 14, wherein the vehicle charging station includes a wireless charging platform, and wherein the wireless charging interface is operatively aligned and thereby available for power transfer upon determining a location of the wireless charging interface is aligned with the charging platform.

* * * * *